April 21, 1970 E. BEREZIN ETAL 3,508,227

INFORMATION SIGNAL GENERATION APPARATUS

Filed Aug. 5, 1966 2 Sheets-Sheet 1

INVENTORS
Evelyn Berezin
Edgar Wolf
William D. Cohen
Francis C. Marino

BY Yuter & Spiecens
ATTORNEYS

April 21, 1970 E. BEREZIN ETAL 3,508,227

INFORMATION SIGNAL GENERATION APPARATUS

Filed Aug. 5, 1966 2 Sheets-Sheet 2

United States Patent Office 3,508,227

Patented Apr. 21, 1970

3,508,227

INFORMATION SIGNAL GENERATION APPARATUS

Evelyn Berezin, New York, Edgar Wolf, New Hyde Park, William D. Cohen, Syosset, and Francis C. Marino, Huntington, N.Y., assignors to Digitronics Corporation, Albertson, N.Y., a corporation of Delaware Filed Aug. 5, 1966, Ser. No. 570,577
Int. Cl. G11b 5/62
U.S. Cl. 340—174.1 6 Claims

ABSTRACT OF THE DISCLOSURE

An information signal generating apparatus including a planar magnetic field shielding element which is provided with apertures representing coded information and through which a magnetic flux from a magnetic field source disposed on one side of the planar element is adapted to pass. A signal generator which may be in the form of an elongated electrical conductor is disposed on the other side of the planar element and is movable across the planar element so that a current is induced in the conductor when it cuts across the magnetic lines of force passing through the aperture thereby to produce electrical signals.

The present invention relates to apparatus for generating digital information signals and more particulary to the generation of signals representing digital information recorded as discrete indicia on a record medium.

In the data processing field there is now a need for inexpensive, manually-operable input devices. One such class of input devices is a "point-of-transaction" input device. Such devices in the form of recorders are widely used, at present, in credit card systems. Other systems concern the processing of information on attendance badges, file cards, roll charts, etc. Credit card systems will be discussed in greater detail, since they are a striking example of a system having its weak link at the input end of the system. In a typical credit card system, the credit card serves as a "stencil" for supplying information usually by the printing of embossed characters (fixed information, i.e. card holder's name, address, identification number) on a record medium. The variable informatoin, i.e. the amount of the transaction, is usually handwritten on the record medium. The record medium is then forwarded to an operator who converts the recorded information into machine readable language generally by key punching perforatable cards or tapes, which are fed to the processing part of the system. Thus, there is considerable human labor and expense involved in getting the information from the point of transaction into the processor.

Many attempts have been made employing mechanical perforators and the like at the point of transaction. However, such devices are, generally, too complex and expensive for the typical point of transaction such as a gasoline station. Attempts have also been made to employ magnetic recording techniques. However, these attempts either required "on the fly" processes entailing complex apparatus or, if static, likewise required complex apparatus usually entailing a source of electrical energy. Furthermore, many of the point-of-transaction input devices are subject to environmental abuses, and have for this reason employed expensive components.

In the copending application Ser. No. 350,346, now abandoned, there has been described improvements in the input devices which record digital data on a magnetizable medium by magnetically shielding discrete areas of the medium, and then subjecting the medium to a magnetic field so as to change the magnetic state of the unshielded areas. The magnetic medium is then read by a magnetic reproducing head to generate the data signals that are fed to a data processor. While such a system solves many of the problems of point-of-transaction input devices, there are many applications requiring substantially on-line input devices, such as instantaneous credit checks of department store charge account holders by the sales clerks. Furthermore, the recording and subsequent reading operations require systems which are expensive. Accordingly, in such systems it is desirable to generate the data signals directly from the credit card or the like without the intermediate step of recording on a magnetizable medium.

It is, accordingly, a general object of the invention to provide a signal generator which satisfies the above cited requirements.

It is another object of the invention to provide such a signal generator which is not only simple and inexpensive but can easily and manually read data from a record medium and generate machine processable signals representing the data recorded on the record medium.

Briefly, the invention contemplates signal generating apparatus which includes a planar magnetic shielding element provided with a plurality of discontinuities such as apertures representing coded information. A magnetic field source means is disposed on one side of the planar element. The magnetic field only passes to the other side of the element via the apertures. There is further contemplated a signal generating means which is disposed, at least, on the other side of the element. The signal generating means is movable across the planar element in the region of the apertures to generate a signal wherever the signal generating means passes through a magnetic field passing through the apertures of the planar element. The apertures can represent the information or the inverse of the apertures can represent the information.

Other objects, features and advantages of the invention will be pointed out in the following detail specification of which the claims form a part, and illustrated in the accompanying drawings, which show, by way of example, and not limitation, the principle of the invention and preferred modes for applying that principle.

Figure 2:
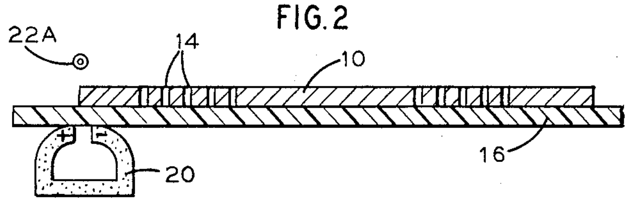
FIGURE 2 is a sectional view of the signal generator taken along the line 2—2 of FIG. 1.
Figure 3A:
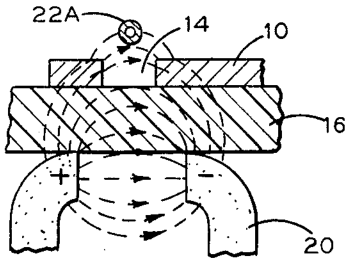
Figure 3B:
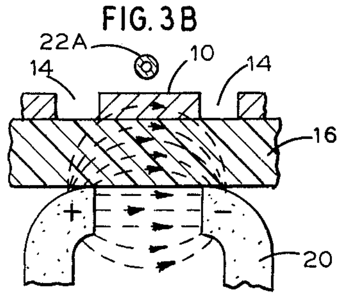
Figure 4:
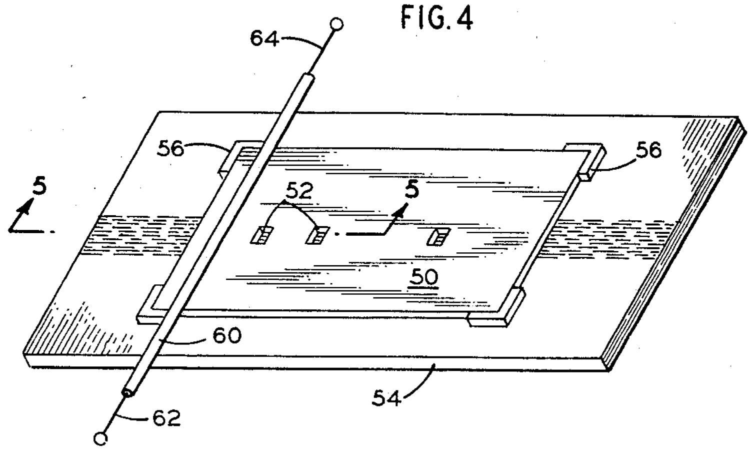
Figure 5:
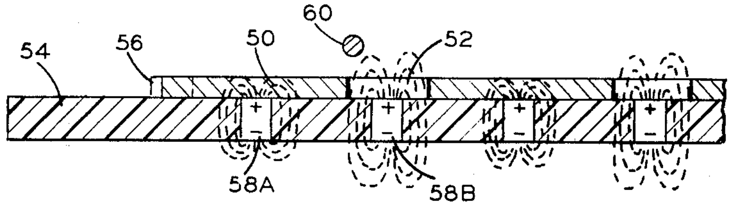

FIGURE 3*a* is an enlarged fragmentary portion of FIG. 2 showing the magnetic field geometry when the magnet is opposite an aperture;

FIGURE 3*b* is similar to FIG. 3*a* but shows the magnetic field geometry when the magnet is not opposite an aperture;

FIGURE 4 is a perspective view of another embodiment of the invention;

FIGURE 5 is an enlarged sectional view taken along the line 5—5 of FIG. 4; and

Figure 6:
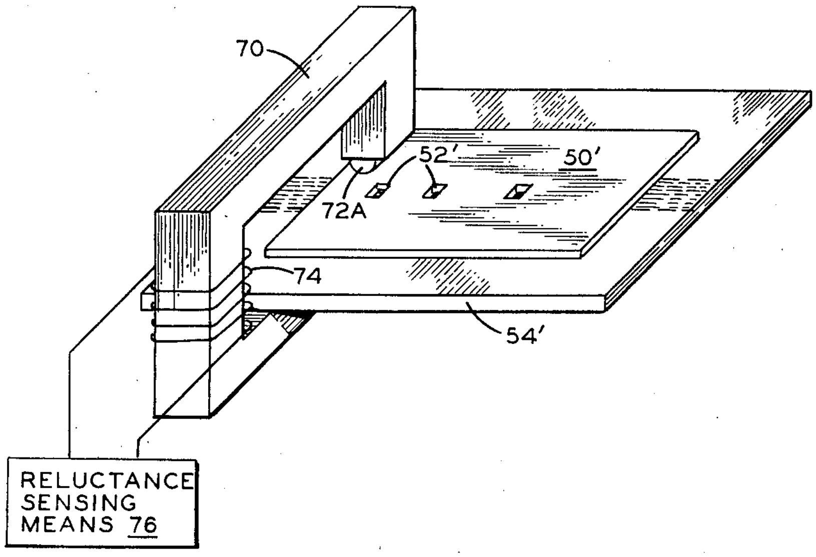

FIGURE 6 is a perspective view of a third embodiment of the invention.

Figure 1:
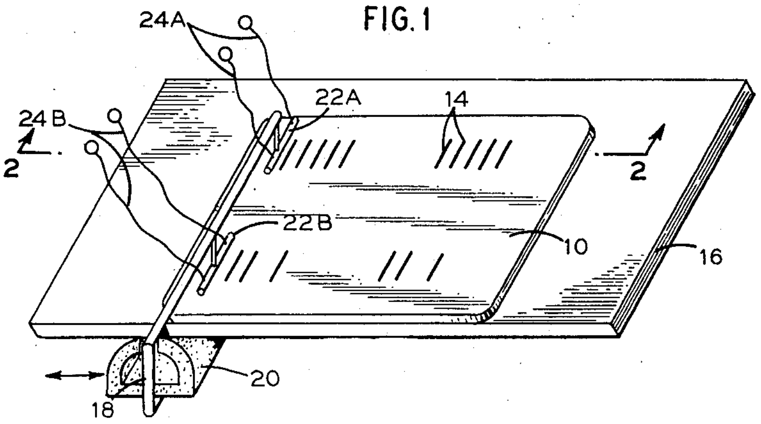
FIGURE 1 is a perspective view of a signal generator, according to one embodiment of the invention, showing an apertured planar magnetic shielding element across which are simultaneously moved an electrical conductor and a magnet.

In FIG. 1 there is shown a magnetic shielding planar element 10, in exemplary form, as a credit card. The element 10 is provided with recording elements as apertures 14. In the exemplary embodiments of FIG. 1, two series of rectangular shaped elements are used since the signal generation desired is two series of pulses transmitted in parallel wherein one series (the upper series in FIG. 1) are "sprocket" (synchronizing) pulses and the other series (the lower) are coded combinations of information bits.

The planar element 10 is preferably made of a magnetically-soft ferromagnetic material such as Mumetal. Mumetal is composed of: 71 to 78 parts of nickel; 4.3 to 6 parts of copper; 0 to 2 parts of chromium; and the remainder iron (see page 155 "Magnetic Recording Techniques" by Stewart, McGraw-Hill). Other magnetically-soft materials with relatively high intrinsic saturation flux density and relatively low coercivity, i.e. less than 3 oersteds, can also be employed, for example, cold rolled steel is satisfactory.

Planar element 10 rests on a nonmagnetic support member 16. A movable carriage member 18 supports a permanent magnet 20 and electrical conductors 22. (See also FIG. 2.) More particularly, magnet 20 has a pair of oppositely polarized pole pieces (+) and (−) which are adjacent one side of planar element 10. Conductors 22 are on the other side of planar element 10. Furthermore, the conductors 22 are disposed opposite the gap between the pole pieces, and conductor 22A is transversely aligned to move across the upper row of apertures while conductor 22B is transversely aligned to move across the lower row of apertures when carriage member 18 moves longitudinally with respect to planar element 10. Signal leads 24A and 24B are connected respectively to conductors 22A and 22B to transmit signals generated by the conductors.

By Faraday's law it is known that a voltage will be induced in a conductor which "cuts" through a magnetic field. Therefore, whenever one of the conductors 22 passes through a nonuniform magnetic field it will generate a signal. The purpose of planar element 10 and its apertures is to create a "binary-coded" discontinuous magnetic field.

Referring now to FIG. 3*a*, whenever the gap between the pole pieces of magnet 20 is opposite an aperture 14, magnetic flux (indicated by the dotted lines) leaves pole piece (+) and enters pole piece (−). Some of the flux passes through support member 16 and enters planar element 10. The flux entering element 10 "fringes" across aperture 14 with a portion of it being above the top surface of element 10. This fringing flux is cut by conductor 22A which generates a signal related to the speed of movement of the conductor through the fringing field and the magnitude of the fringing field. However, when the pole-piece gap is not opposite an aperture, any flux entering the planar element 10 at that point does not fringe into the region of conductor 22A. (See FIG. 3*B*.) Therefore, conductor 22A cuts no flux at this time and no signal is generated.

It should be noted that the conductors 22 can be replaced by Hall effect detectors. In such a case, signal generation is independent of velocity.

In the embodiment of FIGS. 4 and 5 it is only necessary to move the conductor. The magnetic field is generated by fixed bar magnets. More particularly, planar element 50, which is similar to element 10 of FIG. 1, has similar apertures 52. The apertures are placed in preassigned regions of the element. Element 50 is placed on support member 54 and guided by bosses 56 onto a particular region thereof. Support member 54 is primarily composed of a nonmagnetic material in which are embedded permanent bar magnets 58. One of the bar magnets 58 is located at each of the possible positions of an aperture 50. Each of the bar magnets is aligned so that its axis intersects planar element 50. When a bar magnet, such as magnet 58A, is not opposite an aperture, its flux leaves the positive pole piece (+) flows inside element 50 and curves back to the negative pole piece (−). However, when a bar magnet, such as magnet 58B, is opposite an aperture 52, some of the flux passes through the aperture before curving back. Thus, magnetic flux is present on the side of planar element 50 remote from support member 54. Therefore, when a conductor 60 is moved across this side of element 50 a voltage is induced therein whenever it passes an aperture. At that time, a signal is transmitted from terminals 62 and 64 of conductor 60.

The invention can be used without inducing a voltage in a conductor. In FIG. 6 an embodiment is shown wherein the apertures are used to vary the reluctance in a magnetic circuit. Since many of the elements are the same as those described with respect to FIGS. 4 and 5, primed reference characters will be used and only the differences will be mentioned. Planar element 50′ is placed on support means 54′. Support means 54′ need not have bar magnets but may have a band of magnetic material below apertures 52′. A flux concentrating element 70 has spaced and opposed pole pieces 72 which straddle element 50′ and support 54′. As flux concentrating element 70 moves longitudinally along support means 54′, pole piece 72A moves over the top surface of planar element 50′ and particularly past apertures 52′, and pole piece 72B (not shown) moves over the bottom surface of support means 54′. The reluctance of the magnetic circuit comprising flux concentrating element 70 and the gap between the pole pieces 72, is varied by the material in the gap. In particular, there is a discontinuous change in the reluctance when the gap includes one of the apertures 52′. The change in reluctance is most easily sensed by providing element 70 with a winding 74 which becomes part of an AC-energized tuned circuit of reluctance sensing means 76.

While only a limited number of embodiments have been shown and described in detail, there will now be obvious to those skilled in the art many modifications and variations which satisfy many or all of the objects of the invention but which do not depart from the spirit thereof. For example, instead of using discrete bar magnets in the embodiment of FIGS. 4 and 5, a single strip magnet can be used which spans all the apertures in the longitudinal direction of the planar element. The top edge of the strip magnet has one polarity while the bottom edge has the opposite polarity. Furthermore, electromagnets can be employed for the permanent magnets of FIGS. 1 to 5.

What is claimed is:

1. An information signal generating apparatus comprising a planar magnetic field shielding element, said element being provided with a plurality of discontinuities representing coded information, magnetic field source means disposed on one side of said planar element for generating a magnetic field which passes through the other side of said planar element only via the discontinuities, and signal generating means disposed on the other side of said planar element and movable across said planar element in the region of said discontinuities for generating a signal whenever said signal generating means passes through a magnetic field on said other side of said planar element, said signal generating means comprising an elongated electrical conductor movable parallel to the plane of said planar element for intersecting the magnetic flux passing through the discontinuities whereby a current is induced in said elongated conductor.

2. The apparatus of claim 1 wherein said magnetic field source means includes magnetic field generating means including a pair of spaced and opposite polarized pole pieces movable on said one side of said planar element past the apertures.

3. The apparatus of claim 1 including means for supporting said electrical conductor directly opposite said pole pieces on respective sides of said planar element, said supporting means being movable whereby said electrical conductor and said pole pieces simultaneously move past the discontinuities.

4. The apparatus of claim 3 wherein said magnetic field source means comprises means for supporting said planar element and includes at least one magnet means, and said magnet means comprising at least one pair of oppositely polarized pole pieces, one of said pole pieces being adjacent a discontinuity when said planar element is supported by said supporting means and the other of said pole pieces being disposed more remote f.om said discontinuity.

5. The apparatus of claim 3 wherein the apertures are selectively provided at particular spaced regions of said planar element and said magnetic field source means comprises means for supporting said planar element and a plurality of magnet means, each of said magnet means including a pair of oppositely polarized pole pieces, the pole pieces of each pair being disposed in a line substantially perpendicular to the plane of the supported planar element, said magnet means being aligned in spaced relation in said support means corresponding to the spaced regions of said planar element, and means for aligning said planar element on said support means so that each discontinuity is opposite one of said magnet means.

6. An information signal generating apparatus as in claim 1, in which said plurality of discontinuities include a first row of discontinuities representing synchronizing pulses and a second row of discontinuities representing coded combinations of information bits.

References Cited

UNITED STATES PATENTS

| | | | |
|---|---|---|---|
| 3,151,316 | 9/1964 | Bobeck | 340—174 |
| 3,210,527 | 10/1965 | Daykin | 340—174.1 |

OTHER REFERENCES

Stewart, Magnetic Recording Techniques, 1958 p. 93 and 94.

BERNARD KONICK, Primary Examiner

W. F. WHITE, Assistant Examiner

U.S. Cl. X.R.

235—61.11, 61.12; 340—174